United States Patent Office 3,276,190
Patented Oct. 4, 1966

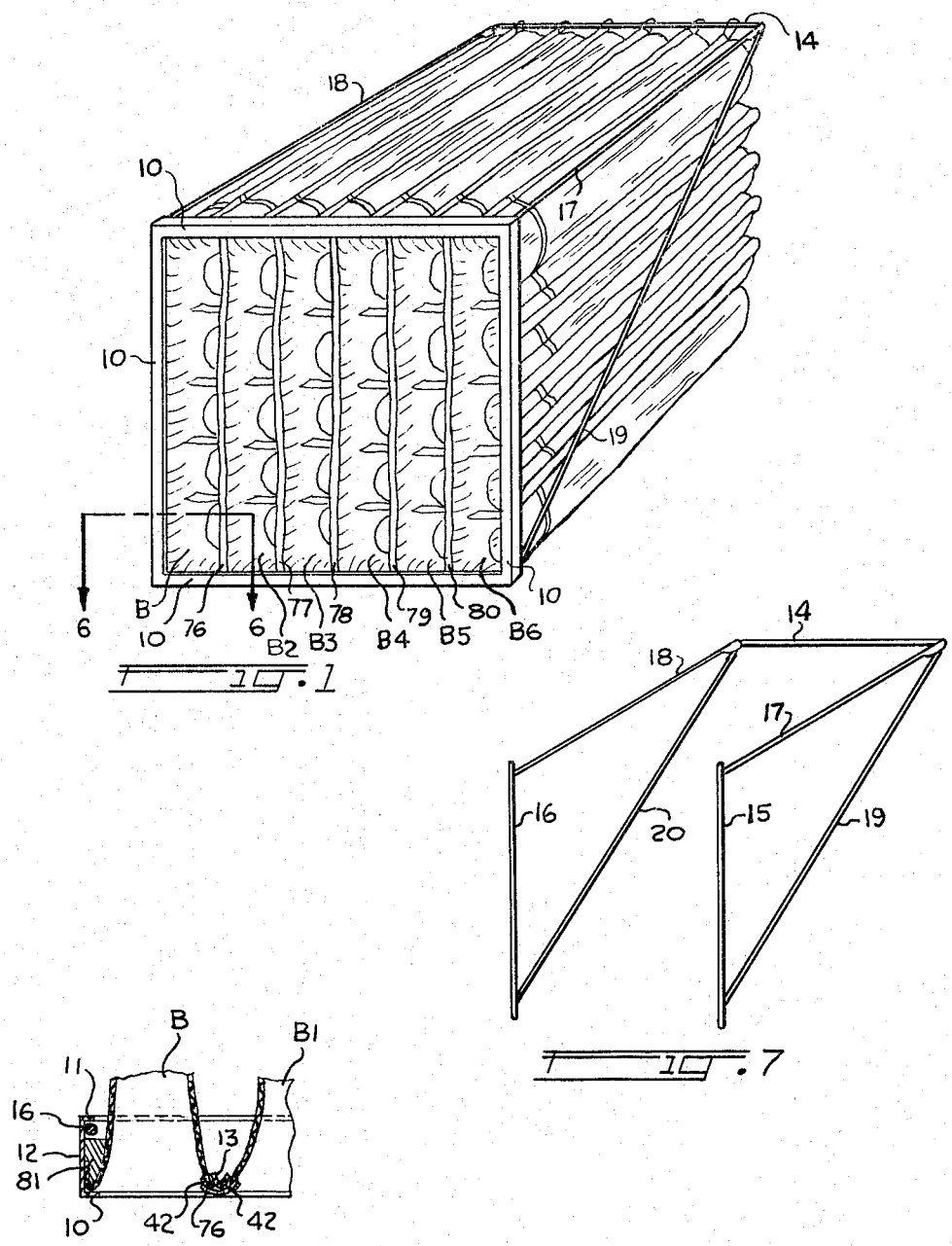

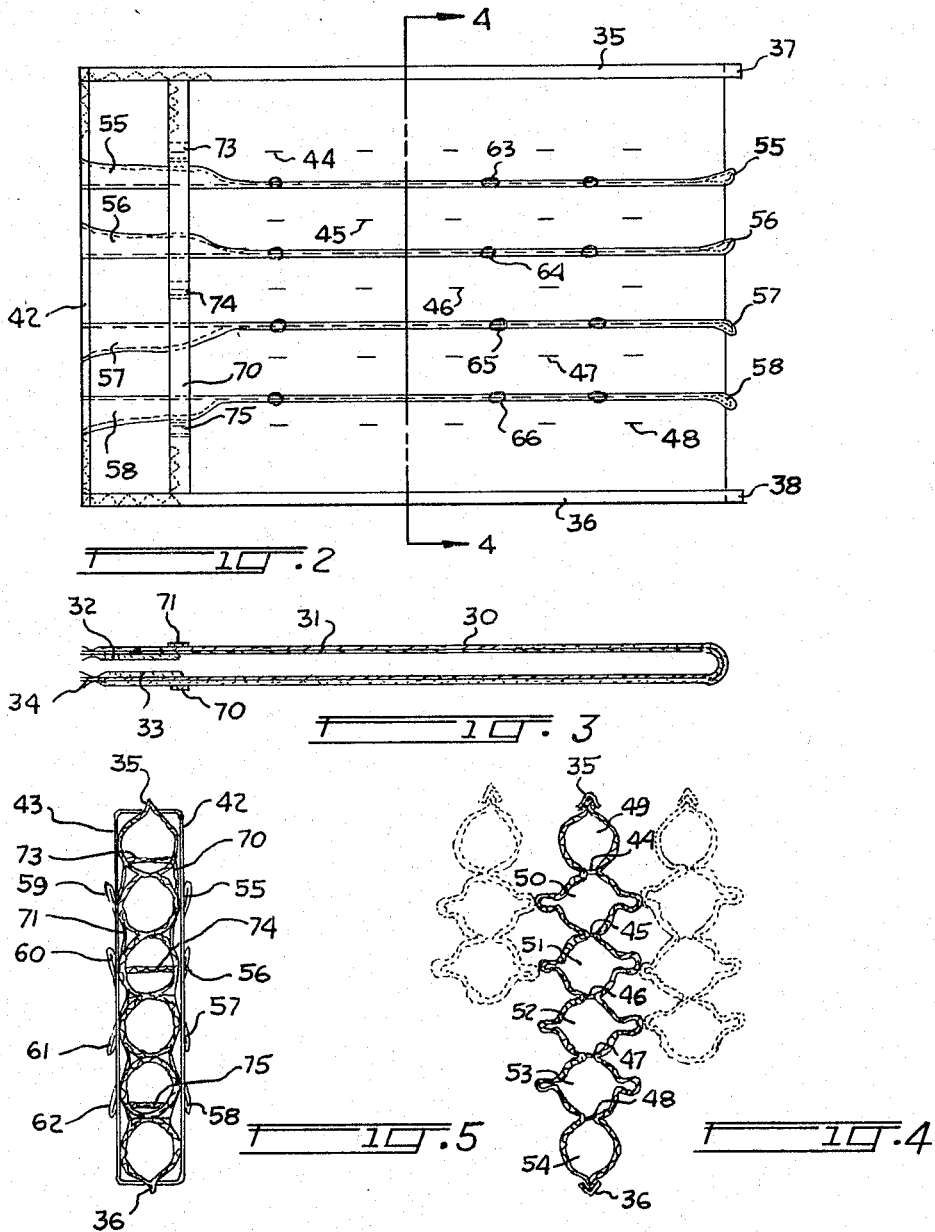

3,276,190
BAG-TYPE GASEOUS FLUID FILTER HAVING ENLARGED FILTERING SURFACES
John F. Babbitt and Oscar A. Wurtenberg, Louisville, Ky., assignors to Continental Air Filters, Inc., Louisville, Ky., a corporation of Delaware
Filed Nov. 12, 1964, Ser. No. 410,563
6 Claims. (Cl. 55—341)

This invention relates to an improved bag-type filter for removing dust and other particulate matter from gaseous fluids, and more particularly to such a filter in which an enlarged amount of filtering surface is disposed in the duct space occupied by the filter.

A tubular bag, which when distended under internal pressure to form a circular cross-section, has the disadvantage of possessing a minimum of peripheral length for the volume enclosed within the bag. To increase this peripheral length, which is directly related to the filtering capacity of the filter, many variations of bag shape to insure a non-circular cross-section thereof have been proposed. However, the fabrication of such modified bags and the means for mounting the same in operative position within the filter frame have been attended with difficulties, and generally have resulted in more expensive filters. It is a purpose of our invention to overcome these and other disadvantages of the conventional bag-type filter by employment of a bag having one or more lateral lobes integrally formed thereon during the manufacture of the bag thereby to add the filtering surface of the bag.

An object of the invention is to provide a simple and efficient bag-type filter for gaseous fluids having an enlarged filtering surface.

Another object is to provide a bag-type filter having a plurality of bags with side lobes on each bag contributing jointly to the filtering action and to the relative positioning of the bags during use.

A further object is to provide a bag-type filter characterized by its increased filtering capacity and by a low resistance.

These and other objects and advantages of the invention will become more apparent as the description proceeds and when considered in conjunction with the accompanying drawings in which;

FIG. 1 is a perspective view of a filter embodying the invention and in readiness for insertion in an air duct.

FIG. 2 is a side elevation view of one of the bags prior to assembly in the filter frame.

FIG. 3 is a top plan view of the folded filter sheet prior to completing the fabrication of the bag therefrom.

FIG. 4 is a sectional view taken on line 4—4 of FIG. 2 with the bag distended, and with portions of adjacent bags indicated schematically in dotted lines.

FIG. 5 is a front end view showing the open mouth of the bag of FIG. 2.

FIG. 6 is a detail view taken on line 6—6 of FIG. 1; and

FIG. 7 is a perspective view of the bag-positioning framework.

Referring first to FIGS. 1 and 6, the filter includes a generally rectangular, one-piece, open-ended narrow frame preferably formed of a light-weight metal and which is adapted for removable positioning transversely of an air duct. This frame has a forward flange 10 which is slightly deeper than the companion rear flange 11 and with the flanges joined together by wall 12 to form an inwardly facing channel. The interior space bounded by the flange 10 establishes a rectangular fluid inlet face for the filter. A plurality of bags indicated at B, B1, B2, B3, B4, and B5, and constructed in the manner later to be described, are adapted for mounting within the frame and have their open mouths suitably spaced by means of small rods or V-shaped spacers, one of which is shown at 13. The ends of such spacers engage in the channel at the upper and lower edges of the frame and thus serve to position the several bags in generally parallel vertical planes.

As will later appear, each bag at its downstream upper end includes a loop portion of binding tape into which a transverse demountable rod 14, as shown in FIG. 7, is inserted. This rod in turn is supported upon a pair of rigid side members having vertical front posts 15, 16; horizontal extensions 17, 18; and inclined braces 19, 20 respectively. The ends of the front posts are adapted to project into the above-described channel space within the frame and the length of the horizontal extensions is such as to hold the several bags fully extended longitudinally when the filter is being employed.

Considering now a typical bag embodying the invention, reference is made to FIGS. 2 to 5, and to certain dimensions illustrating one practical size of the bag. In constructing the bag, a flat rectangular sheet 30 of suitable filtering medium having a length of 72 inches and a width of 41 inches is provided and with a coextensive sheet 31 of net-like material overlying the filtering sheet on its filtered air side. These sheets are folded upon themselves to shorten their length in half and in folded position are placed in a marking template press which locates certain fastening marks thereon for assembly purposes. A pair of short pieces of similar net material 32 and 33 also having a width of 41 inches are stitched in place on the inner faces of the larger sheets at the open end thereof as along a stitch line 34, the remainder of these short pieces being free to move with respect to the larger sheets of material.

A series of rows 44, 45, 46, 47 and 48 of fastening means, such as staples, spaced from each other within each row and located at marked positions, are then employed to join the opposite faces of the bag together and as best seen in FIG. 4, when the bag is later distended, these fasteners serve to divide the bag into a plurality of generally tubular longitudinally extending first filtering portions 49, 50, 51, 52, 53 and 54 respectively. After these staples are in place, the bag is suitably folded on each of its sides intermediate the described rows of staples in order to form pleats 55 to 62, inclusive. These pleats extend from the open mouth of the bag to the downstream end thereof. By means of a series of additional rows of staples engaging the confronting portions of the particular side of the bag and at the bases of the respective pleats thereof, and with the adjacent staples in each row spaced from one another, as indicated by rows 63 to 66 inclusive on one side of the bag (FIG. 2), longitudinal lobes are formed at the sides of the major filtering spaces. A similar arrangement of rows of staples (not shown) is used to form the lobes on the opposite side of the bag. As will be noted, the arrangement of rows of staples is such that no lobes are provided for the uppermost first filtering portion 49 or the lowermost portion 54. As will thus be noted, the formation of the described pleats and lobes reduces the overall width of the fabricated bag but does not substantially reduce the amount of filtering surface thus stored in the bag.

Experience has shown that an improved mounting of the bags can be secured when the uppermost and lowermost tubular portions are devoid of pleats, but it is within the purview of the invention to employ pleats on these portions also if the necessity for additional filtering surfaces for the bag so demands.

After setting the pleats by means of the staples, a first pair of flexible, non-extensible tapes 70 and 71, each about 31 inches long are sewn transversely of the respective sides of the bag to encompass the folded pleats and to reinforce the bag when it is distended in usage. These tapes are located about six inches downstream from the open mouth of the bag. A second pair of tapes 42 and 43 each also having a length of about 31 inches are then sewn around the two edges of the mouth of the bag to provide reinforcement and to confine the upstream edges of the described folded pleats in proper position at the mouth of the bag. Thereafter, a third pair of flexible tapes 35 and 36 having a length of about 75 inches are sewn in place along the longitudinal edges of the folded sheets. These tapes are affixed to the ends of the transverse tapes 42, 43 and 70, 71 and at their downstream ends form loops 37 and 38 into either of which the above-described rod 14 may be inserted, depending upon which loop is to be uppermost in the final assembly. As will be apparent, the described bag has no particular upper or lower edge prior to its assembly into the filter.

The described bag is intended to be employed with similar bags in the actual filter and for the purpose of employing the maximum of the available filtering surface and for reducing resistance, it is necessary to avoid having any unnecessary amount of the surface of one bag touching the surface of an adjacent bag. In order, therefore, to control the shape of the bags in the inlet regions of the same, a series of narrow tapes here shown as three in number at 73, 74, and 75 are fastened at their respective ends to the interior of the filtering sheet 30 and anchored to the tapes 70 and 71 by means of staples. The thin edge of these tapes is presented to the incoming air entering into the first tubular portions of the bag and no significant resistance is offered to the air flow. Moreover, the length of these short tapes, in cooperation with the confining action of the tapes 70 and 71 to which they are anchored and with the established peripheral length of the mouth-defining tapes 42 and 43 of the bag, is such as to form the open mouth of the bag, when ready for permanent mounting in the frame, into a generally rectangular form as best seen in FIG. 5.

In assembling the several bags into place within the filter, a series of elongated binding strips 76, 77, 78, 79 and 80 are affixed to the adjacent portions of the mouth-defining tapes of adjacent bags, as shown in FIG. 1, and the remainder of the mouth-defining tapes of the bags are fastened as by adhesive to the interior surface of the frame channel. A bar 81 of compressible plastic material may be fitted within the channel to serve as a reinforcement for the thus secured bags. The several spacers serving as a backing for the binding strips are then sprung into place within the channel and the framework shown in FIG. 7 is finally installed in order to provide a unitary assembly for insertion into the appropriate duct where filtering is to take place.

Passing now to FIG. 4, a bag as described has four lobes laterally extending from each of its sides and each such lobe comprises a minor filtering space in communication with the major filtering space adjacent such lobe. Lobes of one bag touch the lobe of the next adjacent bag and these jointly serve to position the respective bags in generally vertical planes with the main body of the filtering surfaces of such bags spaced from each other. Accordingly, substantially all of the filter medium within the bag is gainfully employed and resistance to flow is held to a minimum since no large areas of filtering material are in contact with each other. The lobes on the outer sides of the two bags B and B5 may touch the side walls of the duct in which the filter is installed and thus serve to space the main filtering surfaces of these two bags away from the duct walls. The use of the framework, moreover, aids in avoiding displacement of the bags during pressure fluctuations in the medium being filtered.

With the foregoing description in mind, it will be apparent that when any of the bags is distended during the filtering operation the sum of the joint peripheries of the first tubular portions and of the supplementary lobe-like tubular portions within a given bag (here indicated as being about 82 inches) will substantially exceed the corresponding peripheral dimension of the mouth of the bag and of the flexible tapes 70–71 (here indicated as being about 62 inches). While the invention is in no way limited to such bag dimensions, the large amount of useful bag filtering material which can be stored within the filter is, however, represented by the illustrated dimensions.

Having thus described our invention by reference to a specific form of bag employing the same, it will be understood that the invention may be embodied in other forms within the scope of the appended claims and without departing from the spirit of the invention.

What is claimed is:

1. A gaseous fluid filter comprising a rectangular frame, and a plurality of filtering bags supported by said frame with their open mouths arranged at the fluid inlet face of said frame; each of the said bags having a plurality of integral pleats along opposite sides thereof and extending longitudinally of said bag from its mouth to its downstream end, means for holding said pleats in folded condition at the mouth of said bag, means subdividing said bag lengthwise into a plurality of first distendable tubular portions, and means connecting the bag material of the respective first tubular portions together at spaced locations along the base of the respective pleats provided on such first tubular portions and forming thereby lobe-like, supplementary, smaller distentable tubular portions lengthwise of said bag, whereby upon distention of said bag the sum of the joint peripheries of said first and said supplementary tubular portions will exceed the corresponding peripheral dimension of the mouth of said bag.

2. A filter as defined in claim 1 wherein the pleats on said bag are located on other than the outermost first tubular portions of said bag.

3. A filter as defined in claim 1 wherein said means for holding said pleats in folded position includes a flexible binding tape extending around the mouth of said bag and encompassing the upstream end of said pleats.

4. A gaseous fluid filter comprising a rectangular frame and a plurality of filtering bags supported by said frame with their open mouths arranged at the fluid inlet face of said frame; each of said bags having a plurality of integral pleats along opposite sides thereof and extending longitudinally of said bag from its mouth to its downstream end, means for holding said pleats in folded condition at the mouth of said bag, flexible tape means extending peripherally of said bag downstream from said frame and assisting in holding said pleats in folded position, means subdividing said bag lengthwise into a plurality of first distendable tubular portions downstream from said flexible tape means, and means connecting the bag material of the respective first tubular portions together at spaced locations along the base of the respective pleats provided on such first tubular portions and forming thereby lobe-like, supplementary, smaller distendable tubular portions lengthwise of said bag, whereby upon distention of said bag the sum of the joint peripheries of said first and said supplementary tubular portions will exceed the corresponding peripheral dimension of each of the mouth of said bag and of said flexible tape means.

5. A filter as defined in claim 4 wherein said bag includes a plurality of flexible non-extensible members extending across the interior space within said bag and anchored at their ends to said flexible tape.

6. A gaseous fluid filter comprising a rectangular frame, a plurality of filtering bags supported in generally parallel vertical planes by said frame and with their open mouths arranged at the fluid inlet face of said frame; each of said bags having a plurality of integral pleats along opposite sides thereof and extending longitudinally of said bag from its mouth to its downstream end, means for holding said pleats in folded condition at the mouth of said bag, means subdividing said bag lengthwise into a plurality of first distendable tubular portions, means connecting the bag material of the respective first tubular portions together at longitudinally spaced points along the base of the respective pleats provided on such first tubular portions and forming thereby lobe-like supplementary, smaller distendable tubular portions lengthwise of said bag whereby upon distention of said bag the sum of the joint peripheries of said first and said supplementary tubular portions will exceed the corresponding peripheral dimension of the mouth of said bag, and a detachable framework mounted upon said frame and supporting the downstream ends of each of said bags in longitudinally extended position.

References Cited by the Examiner

UNITED STATES PATENTS

| | | | |
|---|---|---|---|
| 2,607,436 | 8/1952 | Martin | 55—381 X |
| 2,774,443 | 12/1956 | Slayter | 55—379 |
| 3,124,441 | 3/1964 | Rivers | 55—500 |

ROBERT F. BURNETT, *Primary Examiner.*